United States Patent [19]

Dron

[11] 4,339,739
[45] Jul. 13, 1982

[54] LINEAR DISPLACEMENT TRANSDUCER
[75] Inventor: Sylvain M. Dron, Buc, France
[73] Assignee: Societe Nationale D'Etude et de Construction de Moteurs D'Aviation, "S.N.E.C.M.A.", Paris, France
[21] Appl. No.: 204,341
[22] Filed: Nov. 5, 1980
[30] Foreign Application Priority Data
  Nov. 5, 1979 [FR] France .................. 79 27620
[51] Int. Cl.³ ........................... H01F 21/06
[52] U.S. Cl. .............................. 336/136
[58] Field of Search ........... 336/130, 131, 136, 117, 336/118, 119, 120, 30

[56] References Cited
U.S. PATENT DOCUMENTS

| | | | |
|---|---|---|---|
| 2,568,587 | 9/1951 | MacGeorge | 336/136 |
| 2,568,588 | 9/1951 | MacGeorge | 336/136 X |
| 2,985,854 | 5/1961 | Brosh | 336/136 X |
| 3,017,590 | 1/1962 | Chass | 336/136 |
| 3,054,976 | 9/1962 | Lipshutz | 336/136 |
| 3,181,055 | 4/1965 | Bischof | 336/136 X |

Primary Examiner—Thomas J. Kozma
Attorney, Agent, or Firm—Oblon, Fisher, Spivak, McClelland & Maier

[57] ABSTRACT

A hybrid-coil linear displacement transducer including a base having recesses in which are distributed a primary coil and two secondary coils having a different number of turns, wound scarf-joint fashion, connected in series and in opposition and arranged, at least partially, facing the primary coil, a coupling core moving between the primary and the secondary coils so as to cause the voltages at the terminals of the transformer's secondary coils to vary, wherein the secondary coils consist of two windings made of two wires wound simultaneously, at least one of these two windings being connected in series to a third coil constituting the secondary of an additional transformer of which the primary is connected in series to the primary of the hybrid coil.

11 Claims, 7 Drawing Figures

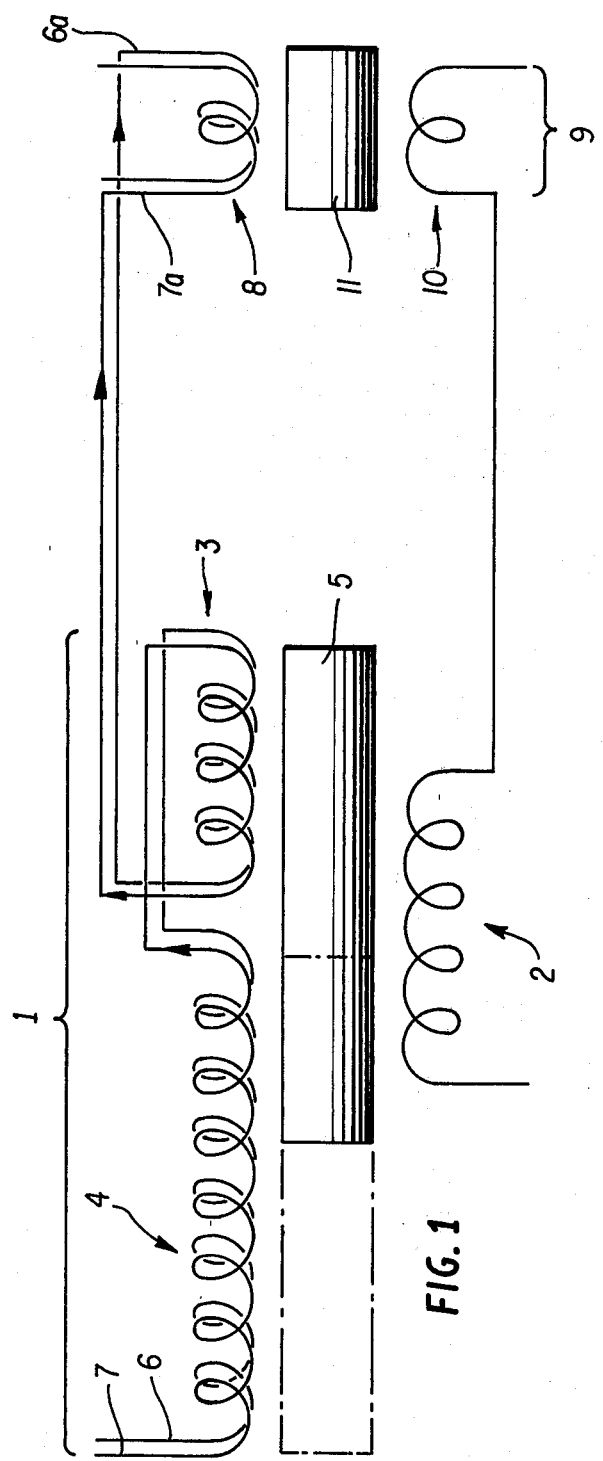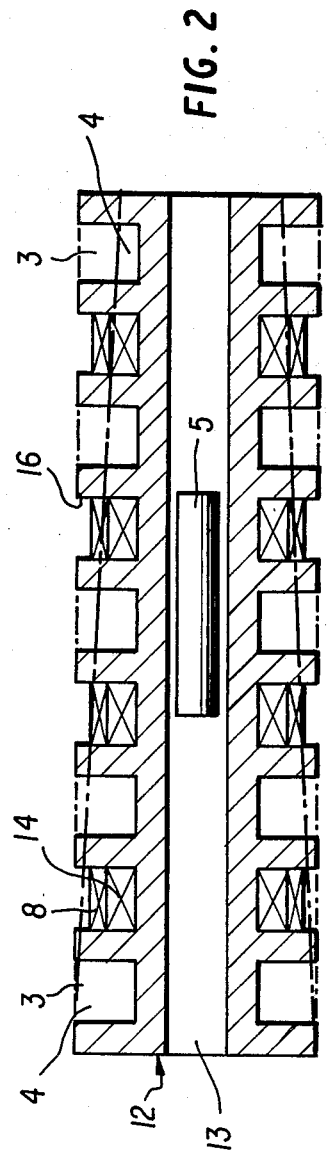

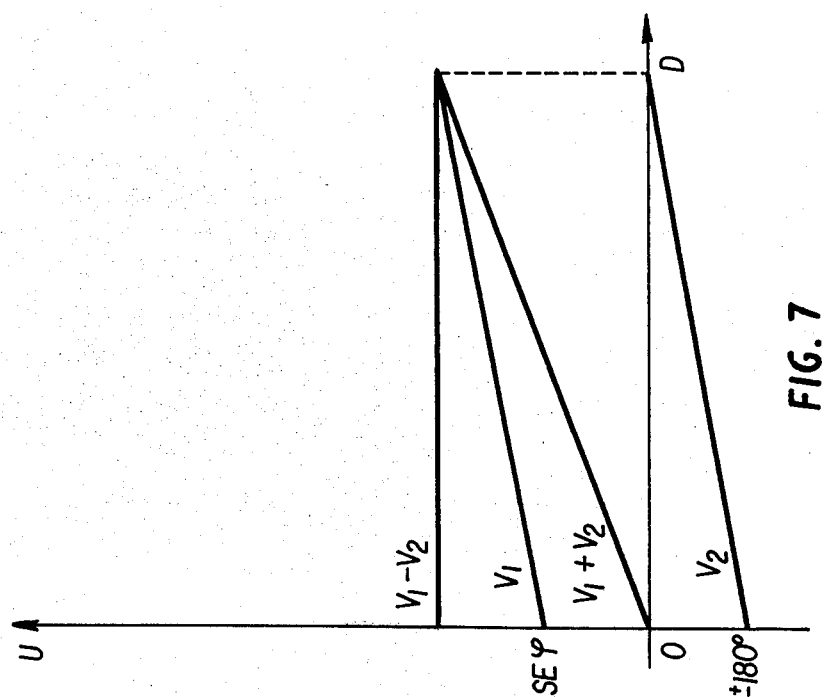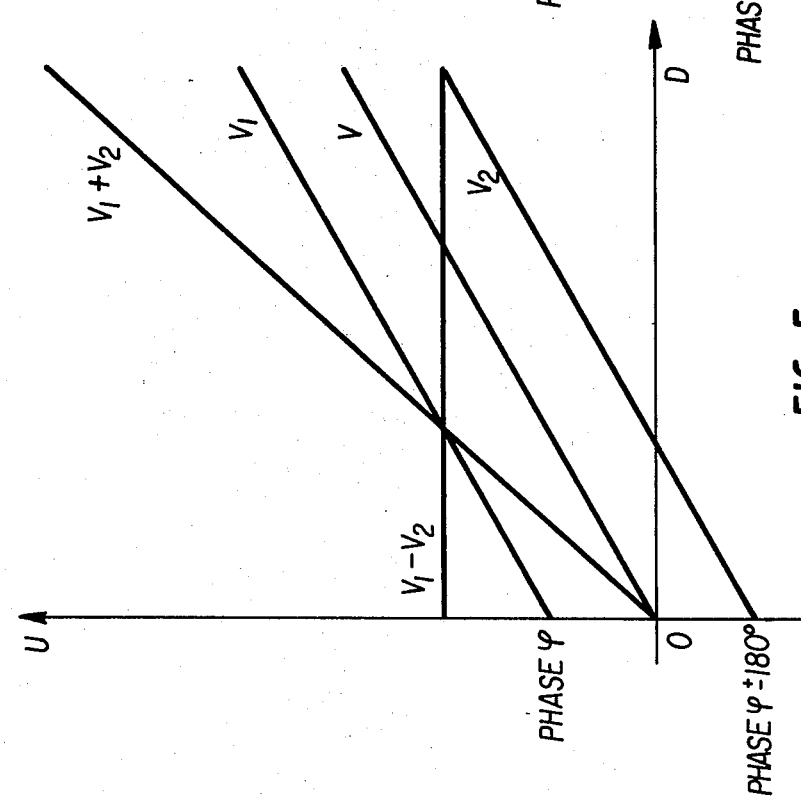

LINEAR DISPLACEMENT TRANSDUCER

BACKGROUND OF THE INVENTION

1. Field of the Invention

This invention relates to a linear displacement transducer.

2. Description of the Prior Art

A linear displacement transducer including a hybrid coil formed of a primary coil and two secondary coils is already known. The two secondary coils connected in series and in opposition are arranged at least partially facing the primary coil. A coupling core moves in both directions between the primary and secondary coils so as to cause voltages to vary continuously at the terminals of the transformer's secondary coils.

In this type of known transducer, the two secondary coils are connected in series and in opposition, and when these two coils are identical the voltage is cancelled out when the coupling core is placed symmetrically in relation to the secondary coils. When the core moves in either direction, the amplitude of the voltage increases linearly, but the phase at the secondary terminals is displaced by a 180° angle depending on the direction of the core. In certain cases of measurement, this phase displacement is ignored, with only the variation in voltage amplitude as a function of the core displacement being of interest. Introduction of an additional secondary coil, which is placed between the two preceding coils, makes it possible to displace the placement of the core according to the length of this additional coil, whereby the voltage of the secondary terminals is cancelled out. This amounts to adding a constant voltage, in relation to the preceding case, proportional to the voltage of the primary.

In the transducer described above, the amplitude of the voltage at the terminals of the secondary coils depends on the voltage delivered by the primary. When this voltage varies around a given position, fluctuations in amplitude occur in the voltage supplied by the secondary coils.

SUMMARY OF THE INVENTION

Accordingly, one object of this invention is to provide a novel linear displacement transducer which remedies these drawbacks, and in particular which eliminates any fluctuation in the primary voltage causing fluctuations in the voltage of the secondary.

The objects of the invention are achieved by providing a linear displacement transducer of the type described above, characterized by the fact that each secondary coil consists of two windings formed of two wires wound simultaneously, at least one of these windings being connected in series to a third coil. This third coil constitutes the secondary of an additional transformer, the primary of which is connected in series to the primary of the hybrid coil.

According to a preferred embodiment, the two windings are connected in series to the third coil, which itself includes two windings consisting of two wires wound simultaneously. One of the windings of the secondary coil of the additional transformer is then connected in phase to one of the wires of the hybrid coil's secondary, and the other winding of the secondary coil of the additional transformer is connected in phase opposition to the other wire of the hybrid coil so as to add, in one case, a potential to the terminals of one of the windings of the hybrid coil's secondaries, and in the other case to deduct a voltage from the terminals of the other winding of the hybrid coil's secondaries.

According to a characteristic of the invention, the voltage added to the terminals of one of the windings of the hybrid coil's secondaries is equal or not equal to the voltage deducted from the terminals of the other winding of the hybrid coil's secondaries.

According to another embodiment, only one of the two windings of the hybrid coil's secondary coils is connected in series with the secondary of the additional transformer, and the voltage added to this winding by the secondary of the additional transformer is then equal to twice the maximum voltage at the terminals of the other winding of the hybrid coil's secondary coils.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic diagram of a first embodiment of the linear displacement transducer according to the invention;

FIG. 2 is a diagrammatic longitudinal cross-sectional view of a transducer according to the invention;

FIG. 5 is a graph illustrating the voltages generated by a transducer according to the first embodiment, as a function of the displacement;

FIG. 7 is a graph illustrating the voltages generated by a transducer according to the second embodiment, as a function of the displacement.

DESCRIPTION OF THE PREFERRED EMBODIMENTS

Figure 3:
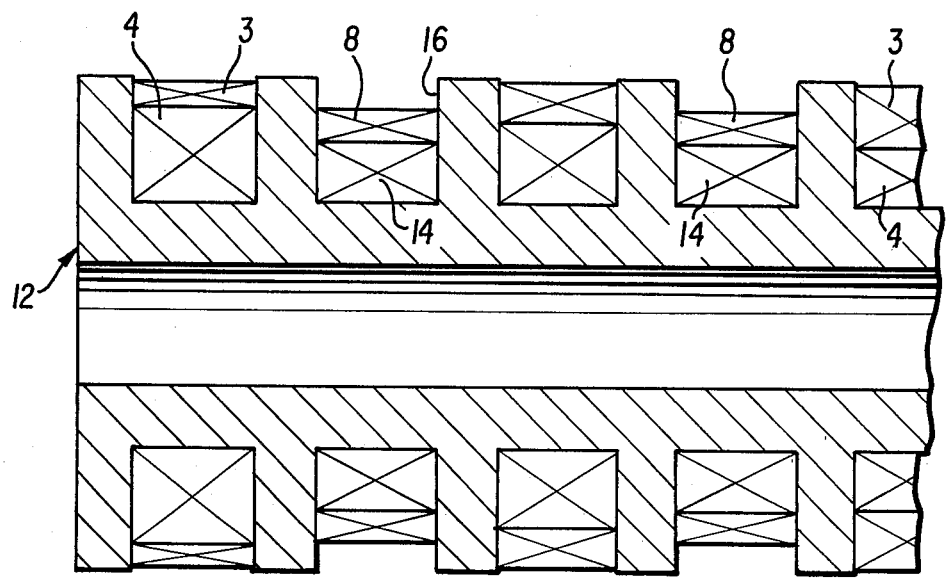
FIG. 3 is a detailed diagrammatic view of the transducer shown in FIG. 2.

Referring now to the drawings, wherein like reference numerals designate identical or corresponding parts throughout the several views, and more particularly to FIG. 1 thereof, the first embodiment of the invention is seen as being formed of a hybrid-coil transducer including a primary coil 2 and two secondary coils 3 and 4 connected in opposition, and a coupling core 5 which moves between the primary 2 and the secondaries 3 and 4. To make it possible to get past the central zero, coil 4 includes a greater number of turns than coil 3 so that the zero is displaced towards one end of the operating range.

In FIG. 1, the optimum displacement of the coupling core 5 has been represented by a dotted line.

The secondary coils 3 and 4 include two wires 6 and 7 wound simultaneously. The coils 3 and 4 are connected in series by the wires 6 and 7 to a third coil 8 including two wires 6a and 7a wound simultaneously. This third coil 8 constitutes the secondary of an additional transformer 9, the primary 10 of which is connected in series to the primary 2 of the hybrid coil 1. Reference 11 represents a possible coupling core between the primary 10 and the secondary 8 of the additional transformer 9.

Figure 4:
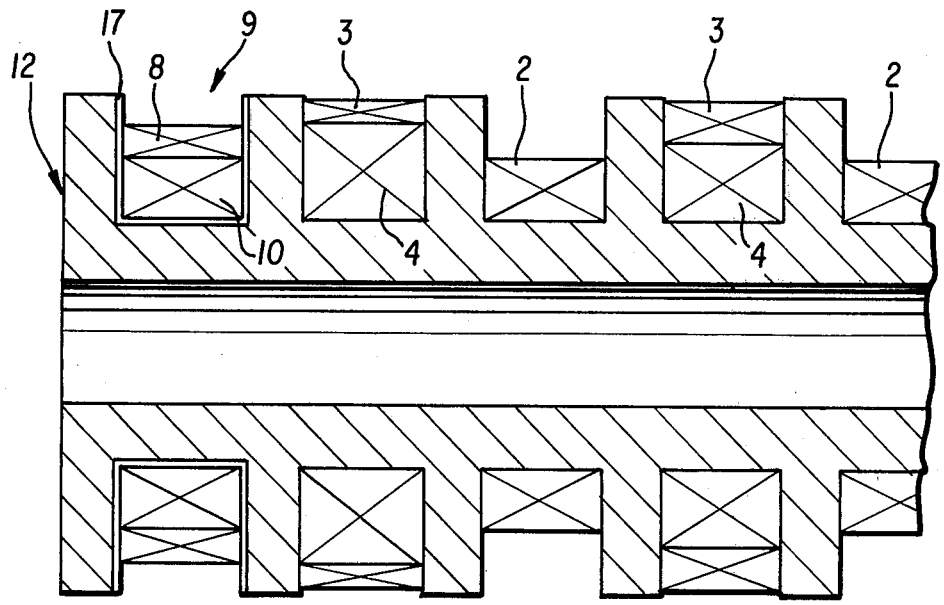
FIG. 4 is a detailed diagrammatic longitudinal cross-sectional view of another transducer according to the invention.

In the description of the diagrams in FIGS. 2, 3 and 4, the two electrical wires forming the different secondary coils will not be shown in order to facilitate understanding them.

FIG. 2 shows a sectional view of the entire transducer according to a first arrangement. The linear displacement transducer includes a base 12 with a hollow part 13 in which the coupling core 5 moves. This base 12 includes recesses 16 arranged regularly along the base. In one recess 16 out of every two is found the primary coil of the additional transformer, merged with that of the hybrid coil so as to form a single primary coil 14. The secondary 8 of the additional transformer is distributed all along the base of the transducer. In the example shown, this secondary 8 is wound in the same recesses 16 as those occupied by the primary 14. In the remaining recesses 16, the two secondary coils 3 and 4 of the hybrid coil are placed, wound "scarf-joint" style, or overlapping, so that when the proportion of the coil of the secondary 3 increases, that of the secondary 4 decreases, and vice versa. However, if it is desired to eliminate a capacitive coupling between the coil 8 and the primary 14 which would bring on a displacement phase, it is quite possible to wind the additional secondary coil 8 in the recesses 16 already occupied by the secondary coils 3 and 4. A combination of these two arrangements may also be envisaged.

FIG. 3 shows in greater detail the coils in FIG. 2; this makes it possible to better distinguish the placement of the secondary coils 3 and 4 and their arrangement in the recesses 16. These coils 3 and 4 occupy one recess 16 out of every two. In the other recesses are placed the single primary 14 of the hybrid coil and the secondary coil 8. Both coils maintain a constant size throughout the transducer.

FIG. 4 shows a detailed diagram of the transducer according to a second arrangement. In this arrangement, the additional transformer 9 is placed at one of the ends of the transducer in one of the recesses in the base 12. This additional transformer is electromagnetically insulated from the hybrid coil by means of a casing 17. This transformer consists of a primary 10 and a secondary 8 constantly coupled to one another. The primary 2 of the hybrid coil is arranged in the other recesses 16 in alternation with the secondaries 3 and 4 of this same transformer. These two secondaries 3 and 4 are wound "scarf-joint" fashion, as above.

The coils 10 and 8 of the additional transformer may appear in the form of a toroid coil. In this case, the end recess remains open at the bottom so as to allow placement of this winding.

The operation of this linear placement transducer of the invention will now be described.

In the two above arrangements of the transducer according to the invention, the displacement of the coupling core does not cause any modification in the voltage at the terminals of the additional transformer's secondary, since the primary and the secondary of the additional transformer are constantly in interaction. On the other hand, because of the position of the primary and the secondaries of the hybrid coil, the coupling varies according to the position of the coil. In addition, because of the ladder-like arrangement of these two coils, the number of turns in the two secondaries in interaction with the primary varies according to the displacement of the core. In fact, the amplitude of the voltage taken in at the terminals of the hybrid coil's secondaries grows linearly, from zero amplitude up to a maximum amplitude depending on the number of turns in the various coils. The coupling core is connected by means of a nonmagnetic bar (not shown) which can move on the axis of the base to different elements, the displacement of which is to be measured.

Because one of the wires of the additional transformer's secondary is connected in series to one of the wires of the secondaries of the hybrid coil so as to add a known voltage to the terminals of the hybrid coil's secondaries, and because the other wire of the additional transformer's secondary is connected in series and in opposition to the other wire of the secondaries of the hybrid coil so as to deduct a constant voltage at the terminals of the secondaries of the hybrid coil, at the output of the transducer two voltages of different amplitude are received, $V_1$ and $V_2$.

FIG. 5 shows diagrammatically the voltages coming out of a transducer according to the first method of realization as a function of the displacement D. The straight line V represents identical voltages coming out of the windings 3 and 4, without an additional transformer. The straight line $V_1$ represents the voltage from one of the wires 7 in phase with 7a while the straight line $V_2$ represents the voltage from the other wire 6 in phase opposition with 6a.

The difference of the voltages $V_1-V_2$ is a constant represented by a straight line parallel to the axis of the displacements D.

The sum of the voltages $V_1+V_2$ is represented by a double-slope straight line from the parallel straight lines representing respectively $V_1$ and $V_2$.

Utilization of the difference $V_1-V_2$ makes it possible to monitor the integrity of the transducer and utilization of the ratio $$\frac{V_1 + V_2}{V_1 - V_2}$$

makes it possible to obtain a displacement function independent of the primary voltage and of variations in temperature.

Figure 6:
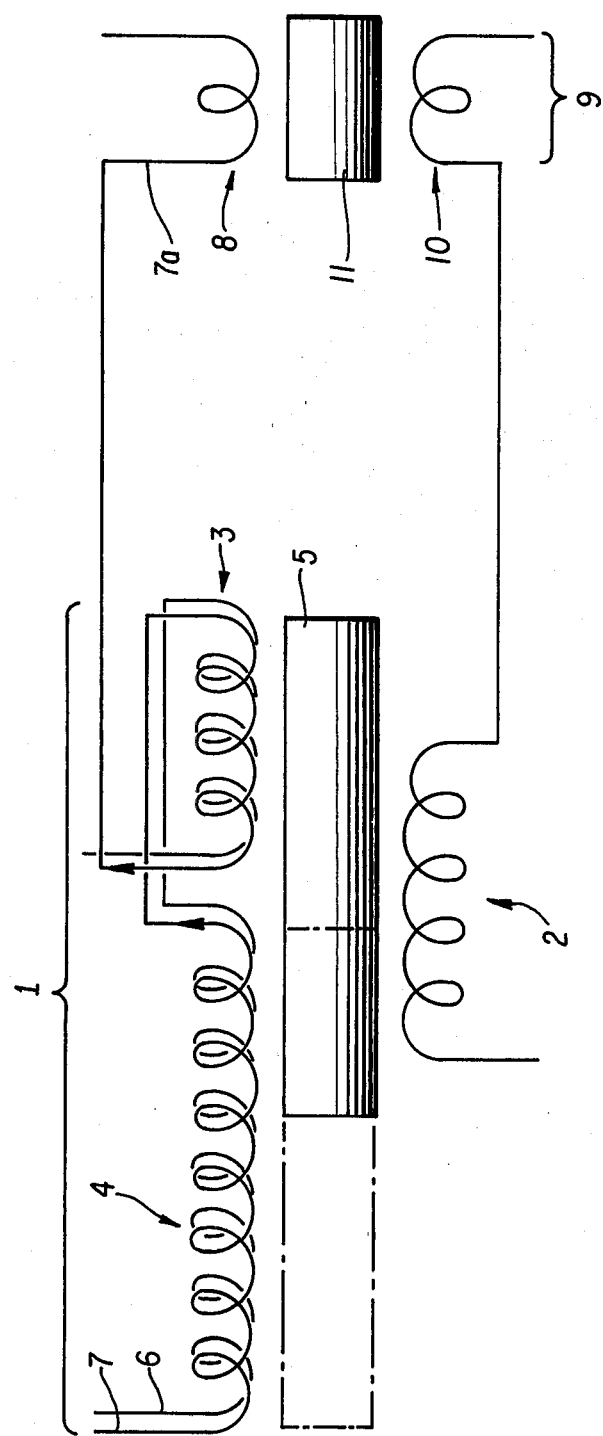
FIG. 6 shows a schematic diagram of a second embodiment of the linear displacement transducer according to the invention.

According to the second embodiment of a transducer according to the invention, the schematic diagram of which is given in FIG. 6, the secondary coil 8 of the additional transformer 9 now includes only a single wire 7a connected in series with the wire 7 of the secondary coils 3 and 4 of the hybrid coil 1. But in this embodiment, the voltage obtained at the terminals of the secondary 8 of the additional transformer 9 has an amplitude twice that obtained above with each of the windings of the secondary of this additional transformer.

FIG. 7 shows in diagram form the voltages developed by a transducer according to the second embodiment. The straight line $V_2$ represents the voltage from the wire 6, while the straight line $V_1$ represents the voltage from the wire 7 in phase with 7a. As can be seen in this diagram, the only difference with the first embodiment consists of displacing the voltages $V_1$ and $V_2$, no longer by adding to a voltage V two equal displacement voltages in phase opposition, but rather by directly choosing $V_2$ symmetrical with V and by adding to it, in order to obtain $V_1$, a displacement voltage twice the previous one, and consequently equal to twice the maximum voltage of $V_2$.

In this second embodiment, it is possible to take away the uncertainty in the measurement of $V_1-V_2$ which might arise with the first embodiment as $V_2$ passes by zero.

Such transducers, in association with actuators, make it possible to control the position of various parts, as for example in aeronautics, turbojet nozzle flaps, air brakes and any other control surfaces.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hybrid-coil linear displacement transducer comprising:
    a base provided with plural recesses along the length of said base;
    a first transformer including a primary coil and two secondary coils having a different number of turns, said secondary coils connected in series and in opposition and wound overlapping with respect to each other facing the primary coil, said secondary coils comprising a pair of windings each made of two simultaneously wound wires;
    a coupling core moving between said primary coil and said secondary coils so as to cause the voltage induced at the terminals of the secondary coils to vary accordingly; and
    a second transformer comprising a secondary coil connected in series with at least one of the wires of one of the windings of the secondary coils of the first transformer and a primary coil connected in series with the primary coil of the first transformer.

2. A transducer according to claim 1, further comprising:
    said secondary coil of said second transformer including two wires simultaneously wound;
    wherein the two windings of said secondary coils of the first transformer are connected in series with at least one wire of the secondary coil of the second transformer.

3. A transducer according to claim 2, further comprising:
    one of the windings of the secondary coil of the second transformer connected in phase to one of the wires of the secondary coils of the first transformer, and
    the other winding of the secondary coil of the second transformer connected in phase opposition to the other wire of the secondary coils of the first transformer.

4. A transducer according to claim 3, further comprising:
    said first and second transformer having terminals interconnected such that the voltage added to the terminals of one of the windings of the secondary coils of the first transformer is equal to that deducted from the terminals of the other winding of the secondary coils of the first transformer.

5. A transducer according to claim 3, further comprising:
    said first and second transformers having terminals interconnected such that the voltage added to the terminals of one of the windings of the secondary coil of the first transformer is different from that deducted from the terminals of the other winding of the secondary coils of the first transformer.

6. A transducer according to claim 1, further comprising:
    a single one of the two windings of the secondary coils of the first transformer connected in series with the secondary coil of the second transformer; and
    said first and second transformers having terminals interconnected such that the voltage added to said single winding by the secondary coil of the second transformer is equal to twice the maximum voltage at the terminals of the other winding of the secondary coils of the first transformer.

7. A transducer according to any of the claims 1-6, further comprising:
    the primary coil of the second transformer merged with that of the first transformer, and
    the secondary coil of the second transformer distributed along the base of the transducer.

8. A transducer according to claim 7, further comprising:
    the secondary coil of the second transformer wound in the same recesses as the primary coil of the second transformer.

9. A transducer according to claim 7, further comprising:
    the secondary coil of the second transformer wound in the same recesses as the secondary coils of the first transformer.

10. A transducer according to any of the claims 1-6, further comprising:
    the second transformer disposed at one end of the transducer.

11. A transducer according to any of the claims 1-6, further comprising:
    the second transformer being independent of the first transformer.

* * * * *